United States Patent
Springer et al.

(10) Patent No.: US 12,441,143 B2
(45) Date of Patent: Oct. 14, 2025

(54) MULTI-LINK FRONT SUSPENSION FOR AN UNDERGROUND ARTICULATED DUMP TRUCK

(71) Applicant: Caterpillar Inc., Peoria, IL (US)

(72) Inventors: Steven Denis Springer, Naperville, IL (US); David William Holthaus, Monticello, IL (US); Ryan P. Morge, Clinton, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 18/507,462

(22) Filed: Nov. 13, 2023

(65) Prior Publication Data

US 2025/0153522 A1  May 15, 2025

(51) Int. Cl.
*B60G 7/00* (2006.01)
*B60G 9/02* (2006.01)

(52) U.S. Cl.
CPC .............. *B60G 7/001* (2013.01); *B60G 9/02* (2013.01); *B60G 2300/02* (2013.01)

(58) Field of Classification Search
CPC ................................. B60G 7/001; B60G 9/02
USPC ..................................... 280/124.11, 124.111
See application file for complete search history.

(56) References Cited

U.S. PATENT DOCUMENTS

| 5,458,359 | A | * | 10/1995 | Brandt | B60G 9/00 180/378 |
|---|---|---|---|---|---|
| 5,649,719 | A | | 7/1997 | Wallace et al. | |
| 6,511,084 | B1 | | 1/2003 | Buhl et al. | |
| 6,923,453 | B2 | | 8/2005 | Pivac | |
| 7,938,415 | B2 | * | 5/2011 | Carlson | B60G 9/02 280/124.11 |
| 7,967,307 | B2 | * | 6/2011 | Reineck | B60G 21/0551 280/124.157 |
| 8,371,596 | B2 | | 2/2013 | Johnson et al. | |
| 11,820,188 | B2 | * | 11/2023 | Davis | B60K 1/02 |
| 2001/0042654 | A1 | | 11/2001 | Ratcliffe et al. | |

(Continued)

FOREIGN PATENT DOCUMENTS

| EP | 2382103 A4 | 5/2012 |
|---|---|---|
| WO | 2010132692 A1 | 11/2010 |
| WO | 2022108444 A1 | 5/2022 |

OTHER PUBLICATIONS

Written Opinion and International Search Report for Int'l. Patent Appln. No. PCT/AU2024/051142, mailed Jan. 17, 2025 (16 pgs).

*Primary Examiner* — Paul N Dickson
*Assistant Examiner* — Tiffany L Webb

(57) ABSTRACT

A front suspension for a front axle of a tractor of an articulated vehicle may include an upper suspension link having an axle center mounting arm pivotally connected proximate a top side of the front axle at the axial center of the front axle, and first and second frame mounting arms extending rearward and pivotally connected to a tractor frame of the tractor. The frame mounting arms may be positioned symmetrically with respect to the axial center of the front axle. The front suspension may further include first and second lower support links pivotally connected proximate a bottom side of the front axle, extending rearward from the front axle, and pivotally connected to the tractor frame. The lower support links may be positioned symmetrically with respect to the axial center of the front axle.

20 Claims, 5 Drawing Sheets

(56) References Cited

U.S. PATENT DOCUMENTS

| | | | |
|---|---|---|---|
| 2003/0214118 A1* | 11/2003 | Pavuk | B60G 5/00 280/678 |
| 2005/0146108 A1* | 7/2005 | Dudding | B60G 9/00 280/124.11 |
| 2007/0138755 A1* | 6/2007 | Copsey | B60G 13/005 280/124.128 |
| 2009/0115153 A1* | 5/2009 | Guhman | B60G 9/02 280/124.11 |
| 2020/0324819 A1 | 10/2020 | Cadbury-Allen | |
| 2021/0370942 A1 | 12/2021 | Thompson et al. | |
| 2022/0348180 A1 | 11/2022 | Johnson et al. | |

* cited by examiner

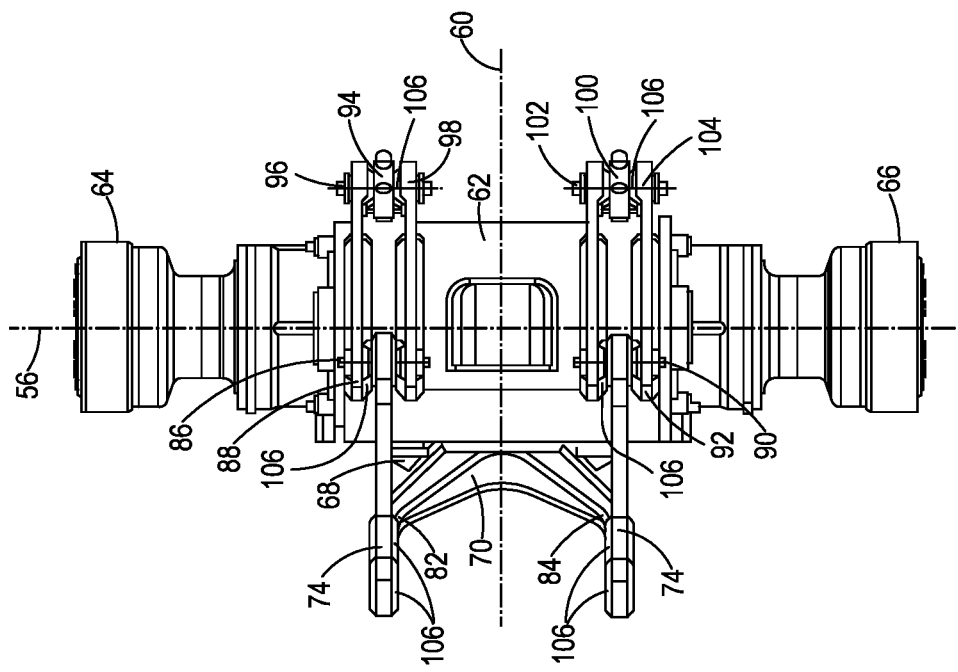

MULTI-LINK FRONT SUSPENSION FOR AN UNDERGROUND ARTICULATED DUMP TRUCK

TECHNICAL FIELD

The present disclosure relates generally to suspensions for articulated trucks and, more particularly, to a multi-link front suspension for a front axle of an articulated truck.

BACKGROUND

Articulated vehicles and work machines, such as articulated dump trucks, excavators, dozers, loaders and the like, may have a center of mass which is relatively high above the ground. This may be as a result of loading during operation, for example where a dump body holds a large mass of material. Work machines are often equipped with work tools which can be raised for safety when not in use and when the vehicle is travelling, which also affects the center of mass of the vehicle. Such work machines are also typically operated on rough and uneven terrain. As a result, there is a risk that the work machine may tip over as it travels over uneven terrain.

This risk is increased for articulated vehicles, in that these typically comprise a tractor (in which the power unit is usually mounted) and a trailer (which may have a container for holding a mass of material or goods for transportation) connected to one another via an oscillating hitch joint. The oscillating hitch joint enables the tractor and trailer to roll and yaw relative to one another. When operated on uneven terrain, one of the tractor and trailer may become positioned at an unsafe roll and/or yaw angle and may cause the entire machine to turn over. Alternatively, if the articulated vehicle has an open container, such as a bucket or body mounted on the trailer, any materials or goods held in the open container may fall out when one of the tractor and trailer is positioned above certain roll and/or yaw angle thresholds.

The chassis system of such articulated vehicles may be designed to help reduce the likelihood of this from occurring. A portion of a chassis system of an articulated vehicle typically comprises a tractor suspension for an axle of the tractor. In previous tractor suspensions, the axle is connected to the frame of the tractor by a pair of horizontal pins that allow the tractor axle to move up and down relative to the tractor frame. This arrangement does not permit rotational motion of the tractor axle relative to the tractor frame. The constrained motion of the tractor axle can result in a poor ride for the driver of the articulated vehicle.

SUMMARY OF THE DISCLOSURE

In one aspect of the present disclosure, a front suspension for a front axle of a tractor of an articulated vehicle is disclosed. The tractor may have a tractor frame, and the front axle may have an axle rotational axis and an axle transverse axis that is perpendicular to the axle rotational axis and positioned at an axial center of the front axle. The front suspension may include an upper suspension link having an axle center mounting arm pivotally connected to the front axle proximate a top side of the front axle and positioned at the axial center of the front axle, a first frame mounting arm extending rearward and pivotally connected to the tractor frame, and a second frame mounting arm extending rearward and pivotally connected to the tractor frame. The first frame mounting arm and the second frame mounting arm may be positioned symmetrically with respect to the axle transverse axis. The front suspension may further include a first lower support link pivotally connected to the front axle proximate a bottom side of the front axle, extending rearward from the front axle, and pivotally connected to the tractor frame, and a second lower support link pivotally connected to the front axle proximate the bottom side of the front axle, extending rearward from the front axle, and pivotally connected to the tractor frame. The first lower support link and the second lower support link may be positioned symmetrically with respect to the axle transverse axis.

In another aspect of the present disclosure, a tractor for an articulated vehicle is disclosed. The tractor may include a tractor frame, a front axle having an axle rotational axis and an axle transverse axis that is perpendicular to the axle rotational axis and positioned at an axial center of the front axle, and a front suspension. The front suspension may include an upper suspension link having an axle center mounting arm pivotally connected to the front axle proximate a top side of the front axle and positioned at the axial center of the front axle, a first frame mounting arm extending rearward and pivotally connected to the tractor frame, and a second frame mounting arm extending rearward and pivotally connected to the tractor frame. The first frame mounting arm and the second frame mounting arm may be positioned symmetrically with respect to the axle transverse axis. The front suspension may further include a first lower support link pivotally connected to the front axle proximate a bottom side of the front axle, extending rearward from the front axle, and pivotally connected to the tractor frame, and a second lower support link pivotally connected to the front axle proximate the bottom side of the front axle, extending rearward from the front axle, and pivotally connected to the tractor frame. The first lower support link and the second lower support link may be positioned symmetrically with respect to the axle transverse axis.

In a further aspect of the present disclosure, a front suspension for a front axle of a tractor of an articulated vehicle is disclosed. The tractor may have a tractor frame, and the front axle may have an axle rotational axis and an axle transverse axis that is perpendicular to the axle rotational axis and positioned at an axial center of the front axle. The front suspension may include an upper suspension link having an axle center mounting arm pivotally connected to the front axle by an axle upper link pivot pin proximate a top side of the front axle and positioned at the axial center of the front axle, a first frame mounting arm extending rearward and pivotally connected to the tractor frame by a first frame upper link pivot pin, and a second frame mounting arm extending rearward and pivotally connected to the tractor frame by a second frame link pivot pin. The first frame mounting arm and the second frame mounting arm may be positioned symmetrically with respect to the axle transverse axis. The front suspension may further include a first lower support link pivotally connected to the front axle by a first axle lower link pivot pin proximate a bottom side of the front axle, extending rearward from the front axle, and pivotally connected to the tractor frame by a first frame lower link pivot pin, and a second lower support link pivotally connected to the front axle by a second axle lower link pivot pin proximate the bottom side of the front axle, extending rearward from the front axle, and pivotally connected to the tractor frame by a second frame lower link pivot pin. The first lower support link and the second lower support link may be positioned symmetrically with respect to the axle transverse axis, and the front suspension may define an instantaneous center of rotation of the front axle that is rearward of the front axle.

Additional aspects are defined by the claims of this patent.

BRIEF DESCRIPTION OF THE DRAWINGS

FIG. 5 is a top view of the front suspension, the front axle and the tractor frame of FIG. 2;

FIG. 6 is a bottom view of the front suspension and the front axle of FIG. 2;

DETAILED DESCRIPTION

Figure 1:
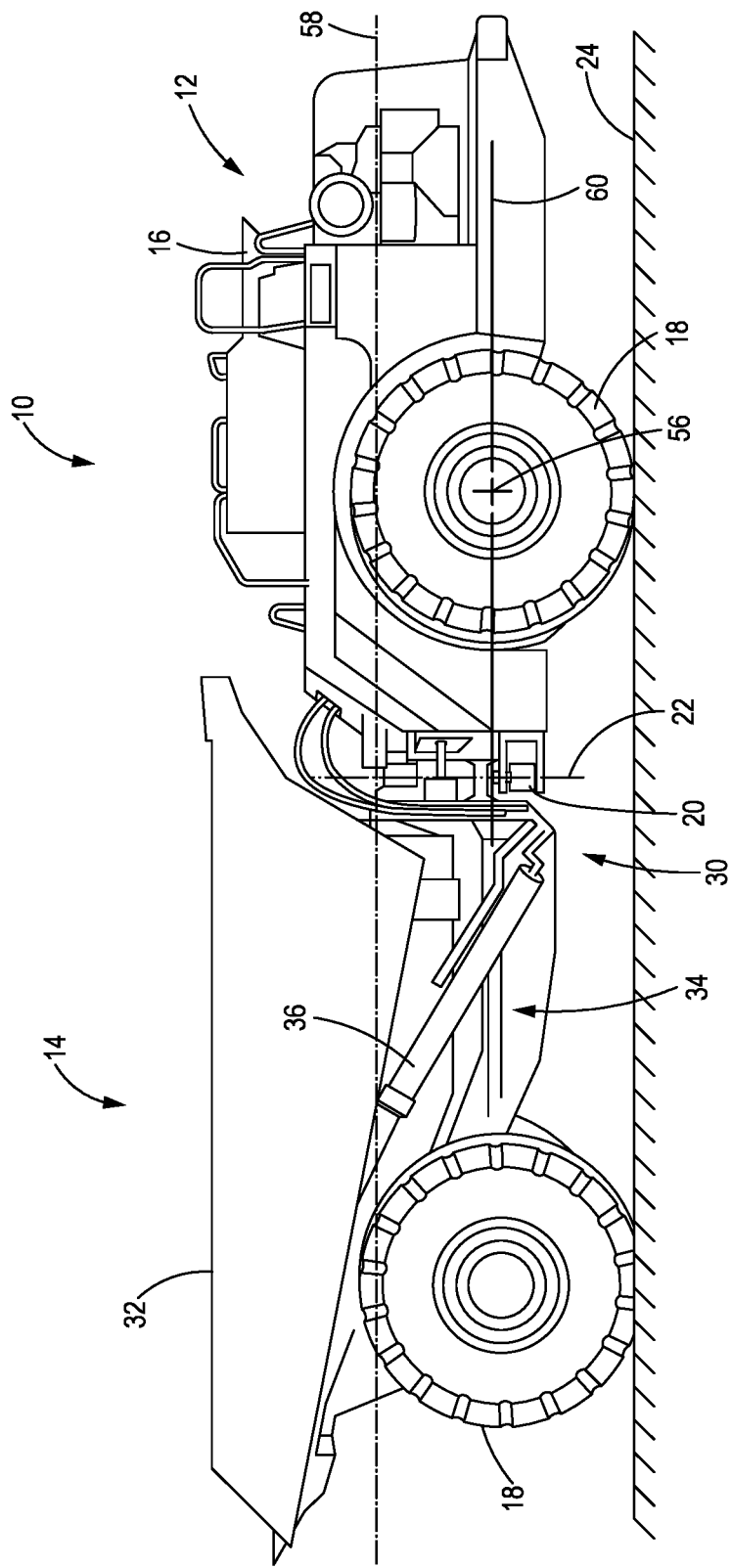
FIG. 1 is a side elevation view of an exemplary articulated vehicle in which a front suspension in accordance with the present disclosure may be implemented.

FIG. 1 illustrates an exemplary articulated vehicle 10 in which a front suspension in accordance with the present disclosure may be implemented. The articulated vehicle 10 may comprise a tractor 12 and a trailer 14. The tractor 12 may be a propulsion unit and may comprise a cab 16 and a power unit (not shown). The power unit may be of any suitable type, such as an internal combustion engine, a micro-turbine, an electric motor or battery cells providing power to electric drive units such as wheel end motors mounted on a front axle (illustrated and describe in relation to FIGS. 2-9) of the tractor 12. The front axle may be provided to support the tractor 12 by having one or more ground engaging means 18, such as wheels, mounted at either end of the front axle. The tractor 12 may comprise more than one axle and more than two ground engaging means 18 attached to each axle, with each axle having a front suspension in accordance with the present disclosure.

The tractor 12 may be connected to the trailer 14 via a coupling 20, which may be an articulation joint. The coupling 20 may allow the tractor 12 and trailer 14 to be orientated at a different yaw and/or roll angle to each other. The yaw angle of the tractor 12 may be different to the yaw angle of the trailer 14 about an articulation axis 22. The articulated vehicle 10 may be steered as it travels over a work surface 244 by adjusting the yaw angle of the tractor 12 and trailer 14 about the articulation axis 22 utilizing actuators (not shown), for example hydraulic cylinders, attached to each of the tractor 12 and trailer 14 on either side of the coupling 20.

The trailer 12 may comprise a chassis system 30 and a body 32 adapted to carry a load, such as a dump or ejector body. The chassis system 30 may comprise a chassis frame 34 and the body 32 may be attached to the chassis frame 34 at a pivot point (not shown). A tipping system may be provided to rotate the body 32 about the pivot point. The tipping system may comprise at least one hydraulic actuator 36 connected to the body 32 and the chassis frame 34. The body 32 may comprise an ejector mechanism, having an actuator which may move a plate within the body 32 to eject any material contained therein.

Figure 2:
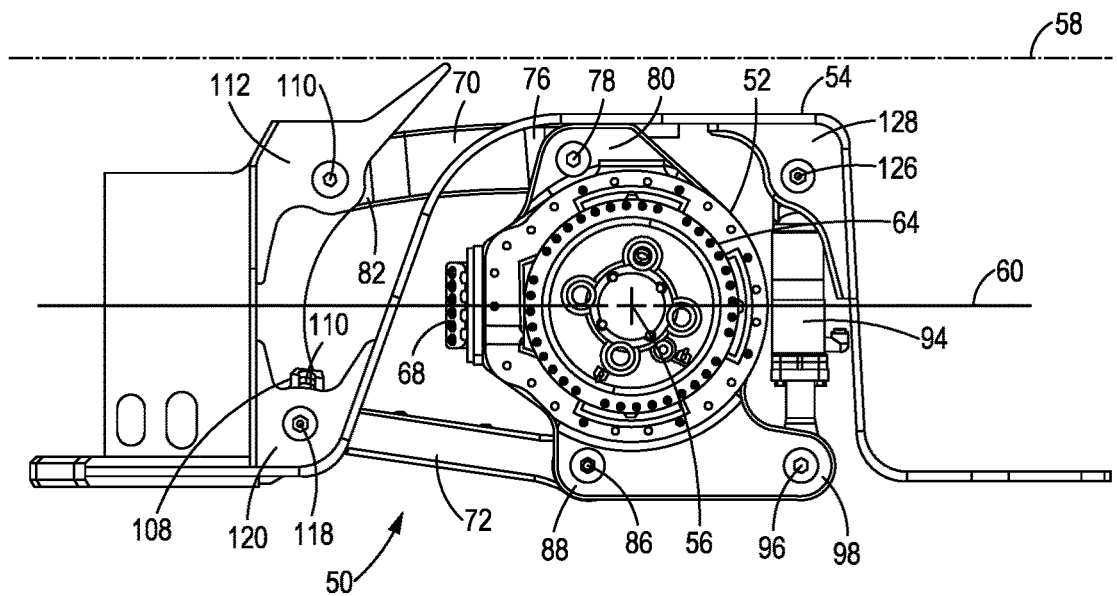
FIG. 2 is a side view of the front suspension in accordance with the present disclosure connecting a front axle to a corresponding portion of a tractor frame of the articulated vehicle of FIG. 1.

FIG. 2 illustrates a side view of an embodiment of a front suspension 50 in accordance with the present disclosure for a front axle 52 of the tractor 12 of the articulated vehicle 10. In this drawing figure, the front wheels 18 and the housing walls of the tractor 12 are removed to better illustrate the front suspension 50, the front axle 52 and the portion of the tractor frame 54 to which the first suspension 50 is mounted. The front suspension 50 of the illustrated embodiment is a four-bar linkage attaching the front axle 52 to the tractor frame 54 in a manner that can allow a degree of rotation of the front axle 52 about instantaneous centers of rotation that are parallel to an axle rotational axis 56 as the front axle 52 moves up and down during travel of the articulated vehicle 10 over the work surface 24. The axle rotational axis 56 may be approximately perpendicular to a longitudinal axis 58 of the tractor 12. An axle transverse axis 60 of the front axle 52 may be perpendicular to the axle rotational axis 56, approximately parallel to the longitudinal axis 58, and positioned at an axial center of the front axle 52.

Figure 3:
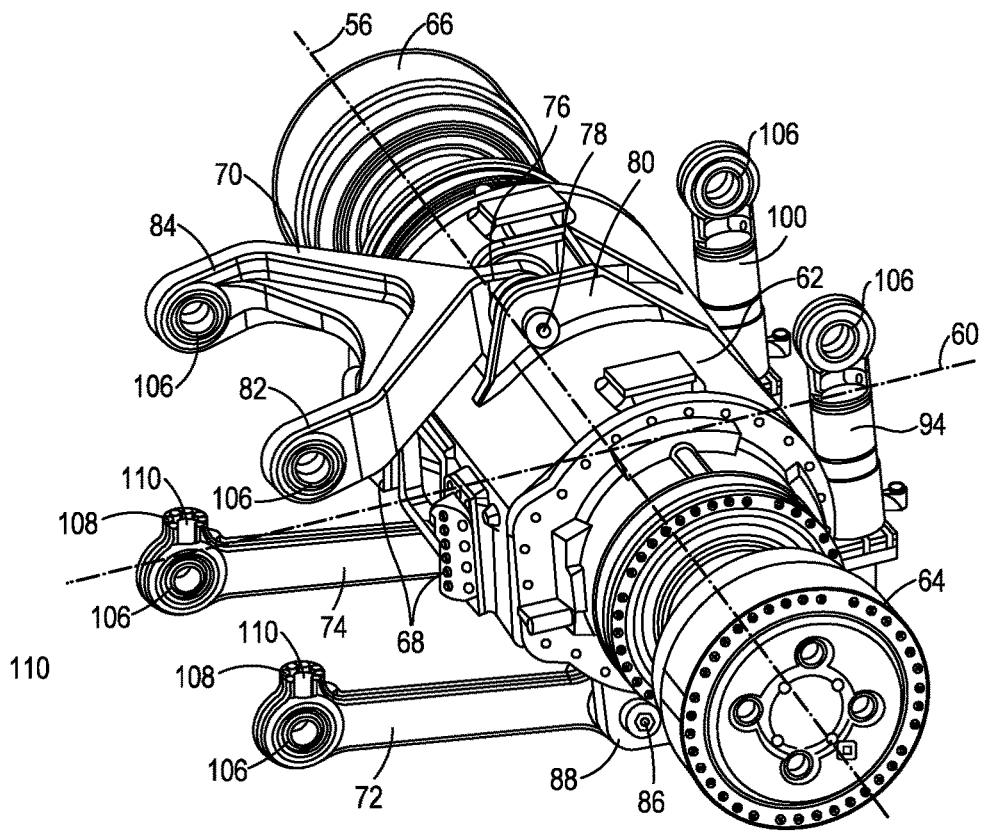
FIG. 3 is an isometric view of the front suspension and the front axle of FIG. 2.
Figure 4:
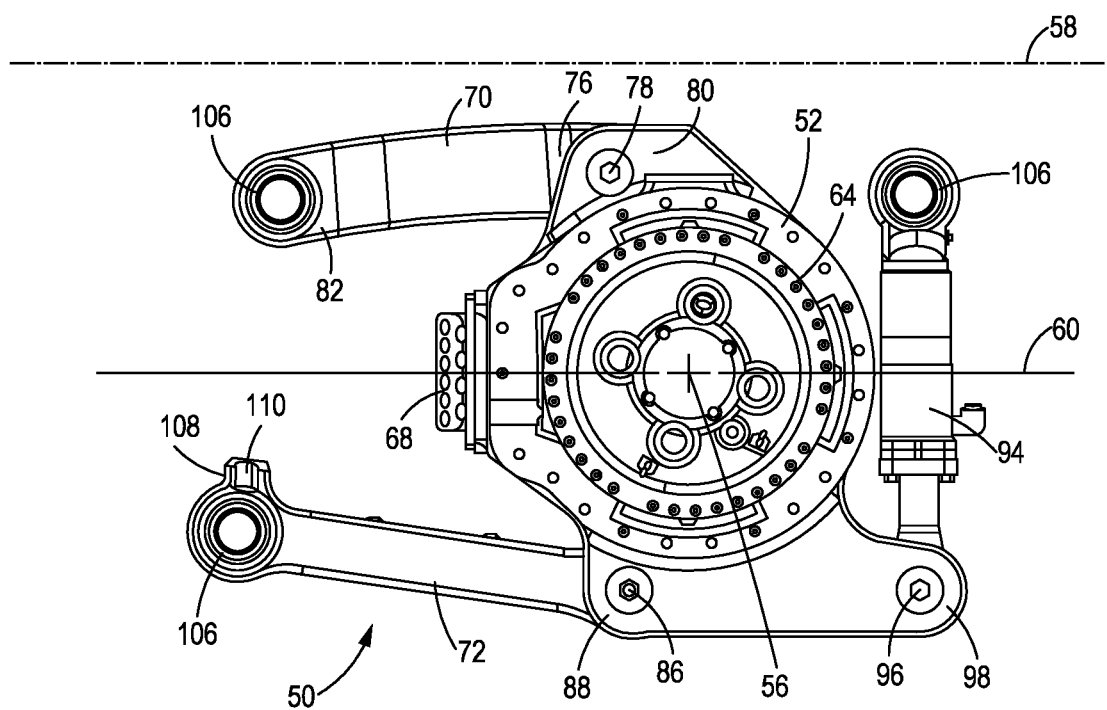
FIG. 4 is a side view of the front suspension and the front axle of FIG. 2.

FIG. 3 illustrates the front suspension 50 and the front axle 52 separate from the tractor frame 54 for better illustration of the components. In the illustrate embodiment, the articulated vehicle 10 may be an electric drive haul truck, and the front axle 52 may include an axle center housing 62 that houses electric end motor assemblies and final reduction and torque assemblies (not shown) that drive a first wheel hub 64 and a second wheel hub 66 on which the front wheels 18 are mounted to propel the articulated vehicle 10. The axle center housing 62 may include wiring harnesses 68 to which mating wiring harnesses (not shown) are attached to provide electric power from battery cells (not shown) and control signals from machine controllers (not shown) to cause the electric end motor assemblies to operate. Those skilled in the art will understand that configuration of the front axle 52 to an electric drive vehicle is exemplary, and that the front suspension 50 in accordance with the present disclosure may be implemented for articulate vehicles 10 driven by other power sources and having other power transmission arrangements.

The front suspension 50 may include an upper suspension link 70, and first lower suspension link 72 and a second lower suspension link 74. The upper suspension link 70 may be U- or Y-shaped with a single point of connection to the axle center housing 62 and two points of connection to the tractor frame 54. An axle center mounting arm 76 of the upper suspension link 70 may be pivotally connected by an axle upper link pivot pin 78 to an axle upper link mounting bracket 80 on a top side of the axle center housing 62. A first frame mounting arm 82 and a second frame mounting arm 84 of the upper suspension link 70 may extend rearward from the axle central mounting arm 76. The frame mounting arms 82, 84 are spaced apart in the longitudinal direction of the front axle 52, with the axle center mounting arm 76 being approximately aligned at the axial center of the front axis 52, and the frame mounting arms 82, 84 being positioned symmetrically with respect to the axle transverse axis 60.

The first lower suspension link 72 may be pivotally connected by a first axle lower link pivot pin 86 to a first axle lower link mounting bracket 88 on a bottom side of the axle center housing 62, and the second lower suspension link 74 may be pivotally connected by a second axle lower link pivot pin 90 to a second axle lower link mounting bracket 92 on the bottom side of the axle center housing 62 (FIG. 6). The lower suspension links 72, 74 may extend rearward from the axle lower link mounting brackets 88, 92, and be positioned symmetrically with respect to the axle transverse axis 60. In the illustrated embodiment, the first lower suspension link 72 is at the same axial distance from the axle transverse axis 60 and vertically aligned with the first frame mounting arm 82 of the upper suspension link 70, and the second lower suspension link 74 is at the same axial distance from the axle transverse axis 60 and vertically aligned with the second frame mounting arm 84 (FIGS. 5 and 6). Of course, those skilled in the art will understand that the lower suspension links 72, 74 may be positioned longitudinally inward or outward of the frame mounting arms 82, 84 depending on the requirements of a particular implementation of the front suspension 50 in accordance with the present disclosure in an articulated vehicle 10.

The front suspension 50 may further include a first vibration damping element 94 that may be pivotally connected by a first axle damping element pivot pin 96 to a first axle damping element mounting bracket 98 on the bottom side of the axle center housing 62, and a second vibration damping element 100 may be pivotally connected by a second axle damping element pivot pin 102 to a second axle damping element mounting bracket 104 on the bottom side of the axle center housing 62 (FIG. 6). The vibration damping elements 94, 100 may be any appropriate damping elements for a work machine, such as shock absorbers. In the illustrated embodiment, the vibration damping elements 94, 100 are hydraulic filled struts. Hydraulic fluid may be added to or bled from the struts to adjust the suspension spring rate that will dampen the movement of the front axle 52 and tractor 12. The hydraulic fluid may also be added or bled to control the ride height of the tractor 12 and the static or normal position of the front axle 52 when the articulated vehicle 10 is stationary. The axle damping element mounting brackets 98, 104 may be separate elements, or may be integrally formed with the corresponding axle lower link mounting brackets 88, 92 as shown in the illustrated embodiment. Additionally, the vibration damping elements 94, 100 may be positioned at the same axial distance from the axle transverse axis 60 as the corresponding lower suspension links 72, 74, or may be axially inward or outward of the lower suspension links 72, 74 if necessary to meet the design requirements for an articulated vehicle 10.

As shown in FIG. 3, the ends of the frame mounting arms 82, 84, the lower support links 72, 74 and the vibration damping elements 94, 100 that will be pivotally connected to the tractor frame 54 as discussed below may include spherical bearings 106 to receive pivot pins connecting the elements to the tractor frame 54. Similar spherical bearing 106 may receive the pivot pins 78, 86, 90, 96, 104 in the connections described above. The spherical bearings 106 allow relative rotation between the elements connected by the pivot pins about the pin rotational axes provided by the pivot pins. The spherical bearings 106 also allow some relative rotation between the connected elements about bearing rotational axes that are perpendicular to the pin rotational axes. The latter relative rotation provided by the spherical bearings 106 will allow oscillation of the front axle 52 about the axle transverse axis 60 as discussed further below. The rotation provided by the spherical bearings 106 may also compensate for misalignment and machining variations when the components are fabricated and the front axle 52 and the front suspension 50 are assembled on the tractor frame 54. The rotation of the spherical bearings 106, at least of the lower suspension links 72, 74, may be limited by upward extending link shoulders 108 proximate the ends that will be connected to the tractor frame 54. Motion of the link shoulders 108 may limited by corresponding mounting brackets of the tractor frame 54 to provide stops for the rotation, and pads 109 on the link shoulders 108 may engage the mounting brackets to prevent metal-on-metal rubbing between the link shoulders 108 and the mounting brackets.

Figure 8:
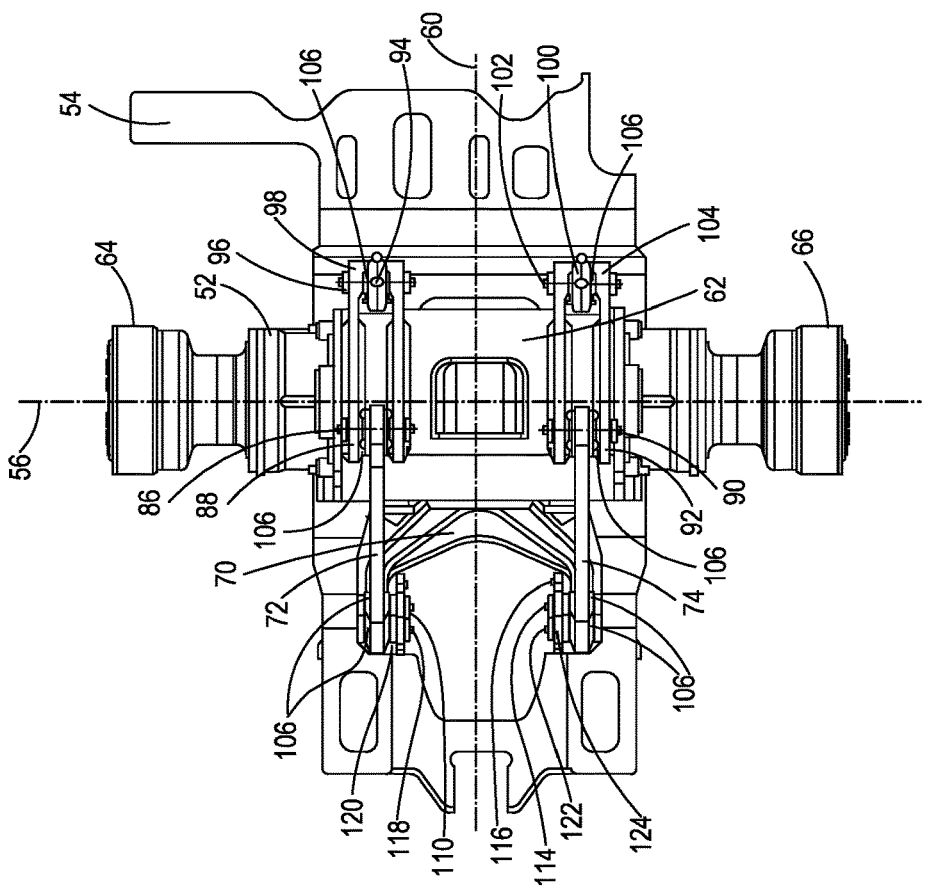
FIG. 8 is a bottom view of the front suspension, the front axle and the tractor frame of FIG. 2.
Figure 7:
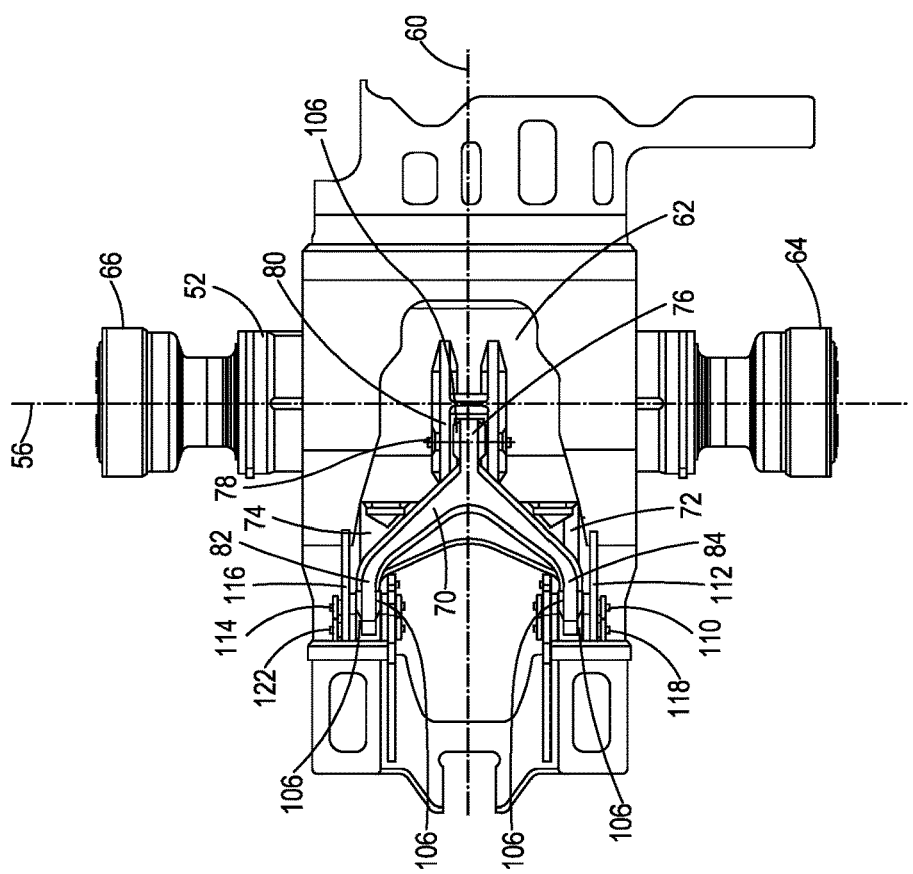
FIG. 7 is a top view of the front suspension, the front axle and the tractor frame of FIG. 2.

Returning to FIG. 2 and referring also to FIGS. 7 and 8, the connections of the front suspension 50 and the front axle 52 to the tractor frame 54 are illustrated. The frame mounting arms 82, 84 of the upper suspension link 70, and the lower suspension links 72, 74, extend rearward from the front axle 52. The vibration damping elements 94, 100 are disposed forward of the front axle 52 and extend generally upward from the damping element mounting brackets 98, 104. The first frame mounting arm 82 is pivotally connected by a first frame upper link pivot pin 110 to a first frame upper mounting bracket 112 of the tractor frame 54, and the second frame mounting arm 84 is pivotally connected by a second frame upper link pivot pin 114 to a second frame upper mounting bracket 116 of the tractor frame 54 (FIG. 7). The first lower suspension link 72 is pivotally connected by a first frame lower link pivot pin 118 to a first frame lower mounting bracket 120 of the tractor frame 54, and the second lower suspension link 74 is pivotally connected by a second frame lower link pivot pin 122 to a second frame lower mounting bracket 124 of the tractor frame 54 (FIG. 8). The first vibration damping element 94 is pivotally connected by a first frame damping element pivot pin 126 to a first frame damping element mounting bracket 128 of the tractor frame 54, and the second vibration damping element 100 is pivotally connected by a second frame damping element pivot pin 130 to a second frame damping element mounting bracket 132 of the tractor frame 54 (FIG. 8).

With this arrangement, the front axle 52 is suspended from the tractor frame 54 by the front suspension 50. As viewed from the side in FIG. 9, the front suspension 50 is a four-bar linkage with links formed by the front axle 52, the tractor frame 54, the upper suspension link 70 and the lower suspension links 72, 74. The tractor frame 54 functions as the frame, the upper suspension link 70 and the lower suspension links 72, 74 are crank/follower links, and the axle center housing 62 is the coupler link. The four-bar linkage controls movement of the front axle 52 during travel of the articulated vehicle 10 over the work surface 24. To function properly, pin rotational axes of the pivot pins 78, 86, 90, 110, 114, 118, 122 are parallel to each other and to the axle rotational axis 56 when the front axle 52 is in the static or normal position shown in the drawing figures. With this alignment, there is no binding between the connected components as the front axle 52 oscillates up and down during travel. As discussed above, the frame mounting arms 82, 84 of the upper suspension link 70 are axially aligned with the corresponding lower suspension links 72, 74 and the lower suspension links 72, 74 are below the frame mounting arms 82, 84, respectively.

In the illustrated embodiment, an upper link length of the upper suspension link 70 from the axle upper link pivot pin 78 to the frame upper link pivot pins 110, 114 is less than a lower link length of the lower suspension links 72, 74 from the axle lower link pivot pins 86, 90 to the frame lower link pivot pins 118, 122. An axle link length from the axle upper link pivot pin 78 to the axle lower length pivot pins 86, 90 is greater than a frame link length from the frame upper length pivot pins 110, 114 to the frame lower link pivot pins 118, 122. The axle upper link pivot pin 78 and the axle lower link pivot pins 86, 90 are at approximately the same transverse distance rearward of the axle rotational axis 56, and the frame lower link pivot pins 118, 122 are further rearward of the axle rotational axis 56 in the transverse direction.

Figure 9:
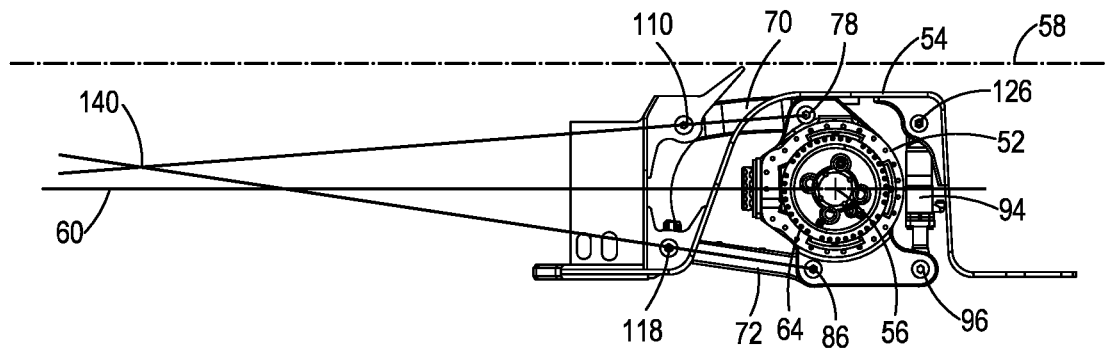
FIG. 9 is the side view of the front suspension, the front axle and the tractor frame of FIG. 2 with lines drawn through pivot pins of an upper suspension link and lower suspension links of the front suspension to indicate an instantaneous center of rotation of the front axle defined by the front suspension.

With this arrangement, an instantaneous center of rotation 140 of the front axle 52 is positioned rearward of the front axle 52 in the transverse direction as shown in FIG. 9. In the illustrated static position of the front axle 52, the instantaneous center of rotation 140 is above the axle rotational axis 56 and the axle transverse axis 60. The actual dimensions of the axle link length, the frame link length, the upper link length and the lower link length may be determined based on the operational requirements of a particular articulated vehicle 10 in which the front suspension 50 in accordance with the present disclosure is implemented. For example, the four-bar linkage may be designed to place the static instantaneous center of rotation 140 at a desired location above or below the axle rotational axis 56 or coincident with the axle transverse axis 60. The link lengths and positions of the pivot pins may be adjusted to move the instantaneous center of rotation 140 further rearward from or closer to the front axis 52. Adding or bleeding hydraulic fluid of the vibration damping elements 94, 100 to adjust the ride height of the tractor 12 may cause the static position of the front axle 52 to raise or lower, respectively, when the vibration damping elements 94, 100 extend or retract. The four-bar linkage can be further designed to move the front axle 52 through a desired path of movement as it oscillates up and down to provide desired ride characteristics, to move within physical constraints within the tractor frame 54, or to achieve other desired performance characteristics.

INDUSTRIAL APPLICABILITY

The design of the four-bar linkage of the front suspension 50 will cause the front axle 52 to move through a prescribed path as the front axle 52 oscillates during travel of the articulated vehicle 10. The motion of the front axle 52 will be a combination of translation and rotation dictated by the link lengths of the front suspension 50. As the front axle 52 moves, the vibration damping elements 94, 100 absorb and damp the shock impulses to provide a smooth ride from the operator in the cab 16 during travel over the work surface 24. At the same time, the spherical bearings 106 at the pivot pins 78, 86, 90, 96, 102, 110, 114, 118, 122, 126, 130 allow a degree of rotation of the connected elements about bearing rotational axes perpendicular to the pin rotational axes provided by the pivot pins 78, 86, 90, 96, 102, 110, 114, 118, 122, 126, 130 so that some rotation of the front axle 52 about the axle transverse axis 60 when encountering portions of the work surface 24 impacting the right and left front wheels 18 to different degrees.

The four-bar linkage of the front suspension 50 can be design to place the instantaneous center of rotation 140 at a position where the front suspension 50 substantially prevents or at least limits raising of the cab 16 when the tractor 12 accelerates, and lowering or nose diving of the cab 16 when the braking the tractor 12 to provide a smooth ride for the operator of the articulated vehicle 10. While the four-bar linkage is illustrated and described herein as defining the instantaneous center of rotation 140 rearward of the front axle 52, it is possible for a particular articulated vehicle 10 in which the front suspension in accordance with the present disclosure with the suspension links 70, 72, 74 extending rearward from the front axle 52 is implemented so that the four-bar linkage defines the instantaneous center of rotation 140 forward of the front axle 52 if doing so creates the desired ride characteristics. As a further alternative, the four-bar linkage could be a parallelogram linkage wherein the upper and lower link lengths are equal, and the axle link length is equal to the frame link length. In this design, the front axle 52 may travel through a curved path without rotating about the axle rotational axis 56. The actual design in any implementation may be dictated by the operational requirements and design constraints for the articulated vehicle 10 in which the front suspension 50 in accordance with the present disclosure is implemented.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A front suspension for a front axle of a tractor of an articulated vehicle, wherein the tractor has a tractor frame, and wherein the front axle has an axle rotational axis and an axle transverse axis that is perpendicular to the axle rotational axis and positioned at an axial center of the front axle, the front suspension comprising:
    an upper suspension link comprising:
        an axle center mounting arm connected to the front axle at a pivotal connection proximate a top side of the front axle and positioned at the axial center of the front axle,
        a first frame mounting arm extending rearward and connected to the tractor frame via a first spherical bearing, and
        a second frame mounting arm extending rearward and connected to the tractor frame via a second spherical bearing, wherein the first frame mounting arm and the second frame mounting arm are positioned symmetrically with respect to the axle transverse axis;
    a first lower support link pivotally connected to the front axle proximate a bottom side of the front axle, extending rearward from the front axle, and pivotally connected to the tractor frame;
    a second lower support link pivotally connected to the front axle proximate the bottom side of the front axle, extending rearward from the front axle, and pivotally connected to the tractor frame, wherein the first lower support link and the second lower support link are positioned symmetrically with respect to the axle transverse axis; and the pivotal connection between the upper suspension link and the front axle being configured to allow the front axle to move about the pivotal connection.

2. The front suspension of claim 1, wherein the first lower suspension link is at the same axial distance from the axle transverse axis and vertically aligned with the first frame mounting arm, and the second lower suspension link is at the same axial distance from the axle transverse axis and vertically aligned with the second frame mounting arm.

3. The front suspension of claim 1, wherein an upper link length between pivotal connections of the upper suspension link to the front axle and the tractor frame is less than a lower link length between pivotal connections of the first lower suspension link and the second lower suspension link to the front axle and the tractor frame.

4. The front suspension of claim 1, wherein an axle link length between the pivotal connection of the upper suspension link to the front axle and pivotal connections of the first lower suspension link and the second lower suspension link to the front axle is greater than a frame link length between pivotal connections of the upper suspension link to the tractor frame and pivotal connections of the first lower suspension link and the second lower suspension link to the tractor frame.

5. The front suspension of claim 1, wherein the pivotal connection of the upper suspension link to the front axle and pivotal connections of the first lower suspension link and the second lower suspension link to the front axle are at the same transverse distance rearward of the axle rotational axis.

6. The front suspension of claim 1, wherein pivotal connections of the first lower suspension link and the second lower suspension link to the tractor frame are further rearward of the axle rotational axis in the transverse direction than pivotal connections of the first frame mounting arm and the second frame mounting arm to the tractor frame.

7. The front suspension of claim 1, wherein the front suspension defines an instantaneous center of rotation of the front axle that is rearward of the front axle.

8. The front suspension of claim 7, wherein the instantaneous center of rotation of the front axle is above the axle transverse axis when the front suspension is in a static position.

9. The front suspension of claim 1, comprising:
a first vibration damping element positioned forward of the front axle and pivotally connected to the front axle and the tractor frame; and
a second vibration damping element positioned forward of the front axle and pivotally connected to the front axle and the tractor frame.

10. The front suspension of claim 9, wherein the first vibration damping element is at the same axial distance from the axle transverse axis as the first lower suspension link, and the second vibration damping element is at the same axial distance from the axle transverse axis as the second lower suspension link.

11. The front suspension of claim 1, comprising a pivot pin at each pivotal connection of the front suspension, wherein the pivot pin defines a pin rotational axis for connected components that is parallel to the axle rotational axis.

12. The front suspension of claim 11, wherein the first spherical bearing allows relative rotation of the connected components about a bearing rotational axis that is perpendicular to the pin rotational axis.

13. A tractor for an articulated vehicle, comprising:
a tractor frame;
a front axle having an axle rotational axis and an axle transverse axis that is perpendicular to the axle rotational axis and positioned at an axial center of the front axle; and
a front suspension comprising:
an upper suspension link having an axle center mounting arm connected to the front axle at a pivotal connection proximate a top side of the front axle and positioned at the axial center of the front axle, a first frame mounting arm extending rearward and pivotally connected to the tractor frame at a connection that permits pivotal movement about a first axis and motion about a second axis that is perpendicular to the first axis, and a second frame mounting arm extending rearward and pivotally connected to the tractor frame, wherein the first frame mounting arm and the second frame mounting arm are positioned symmetrically with respect to the axle transverse axis;
a first lower support link pivotally connected to the front axle proximate a bottom side of the front axle, extending rearward from the front axle, and pivotally connected to the tractor frame;
a second lower support link pivotally connected to the front axle proximate the bottom side of the front axle, extending rearward from the front axle, and pivotally connected to the tractor frame, wherein the first lower support link and the second lower support link are positioned symmetrically with respect to the axle transverse axis; and
the pivotal connection between the upper suspension link and the front axle being configured to allow the front axle to move about the pivotal connection.

14. The tractor of claim 13, wherein an upper link length between pivotal connections of the upper suspension link to the front axle and the tractor frame is less than a lower link length between pivotal connections of the first lower suspension link and the second lower suspension link to the front axle and the tractor frame, and wherein an axle link length between the pivotal connection of the upper suspension link to the front axle and pivotal connections of the first lower suspension link and the second lower suspension link to the front axle is greater than a frame link length between pivotal connections of the upper suspension link to the tractor frame and pivotal connections of the first lower suspension link and the second lower suspension link to the tractor frame.

15. The tractor of claim 13, wherein the pivotal connection of the upper suspension link to the front axle and pivotal connections of the first lower suspension link and the second lower suspension link to the front axle are at the same transverse distance rearward of the axle rotational axis, and wherein pivotal connections of the first lower suspension link and the second lower suspension link to the tractor frame are further rearward of the axle rotational axis in the transverse direction than pivotal connections of the first frame mounting arm and the second frame mounting arm to the tractor frame.

16. The tractor of claim 13, wherein the front suspension defines an instantaneous center of rotation of the front axle that is rearward of the front axle and is above the axle transverse axis when the front suspension is in a static position.

17. The tractor of claim 13, further including a motor assembly connected to the front axle, the motor assembly connected to a housing of the front axle.

18. A front suspension for a front axle of a tractor of an articulated vehicle, wherein the tractor has a tractor frame, and wherein the front axle has an axle rotational axis and an axle transverse axis that is perpendicular to the axle rotational axis and positioned at an axial center of the front axle, the front suspension comprising:
- an upper suspension link comprising:
  - an axle center mounting arm connected to the front axle by an axle upper link pivot pin of a pivotal connection proximate a top side of the front axle and positioned at the axial center of the front axle,
  - a first frame mounting arm extending rearward and pivotally connected to the tractor frame by a first frame upper link pivot pin, and
  - a second frame mounting arm extending rearward and pivotally connected to the tractor frame by a second frame link pivot pin, wherein the first frame mounting arm and the second frame mounting arm are positioned symmetrically with respect to the axle transverse axis;
- a first lower support link pivotally connected to the front axle by a first axle lower link pivot pin proximate a bottom side of the front axle, extending rearward from the front axle, and pivotally connected to the tractor frame by a first frame lower link pivot pin; and
- a second lower support link pivotally connected to the front axle by a second axle lower link pivot pin proximate the bottom side of the front axle, extending rearward from the front axle, and pivotally connected to the tractor frame by a second frame lower link pivot pin, wherein the first lower support link and the second lower support link are positioned symmetrically with respect to the axle transverse axis,
- wherein the front suspension defines an instantaneous center of rotation of the front axle that is rearward of the front axle and above the axle transverse axis when the front suspension is in a static position, and
- the pivotal connection between the upper suspension link and the front axle being configured to allow the front axle to move about the pivotal connection.

19. The front suspension of claim 18, wherein an upper link length from the axle upper link pivot pin to the frame upper link pivot pins is less than a lower link length from the axle lower link pivot pins to the frame lower link pivot pins, and wherein an axle link length axle upper link pivot pin to the axle lower link pivot pins is greater than a frame link length from the frame upper link pivot pins to the frame lower link pivot pins.

20. The front suspension of claim 18, wherein the axle upper link pivot pin and the axle lower link pivot pins are at the same transverse distance rearward of the axle rotational axis, and wherein frame lower link pivot pins are further rearward of the axle rotational axis in the transverse direction than the frame upper link pivot pins.

* * * * *